(No Model.) 4 Sheets—Sheet 1.

J. F. PACKER.
SEED DROPPER.

No. 345,917. Patented July 20, 1886.

Witnesses
Albert H. Adams
Harry T. Jones

Inventor:
John F. Packer (No Model.) 4 Sheets—Sheet 2.

J. F. PACKER.
SEED DROPPER.

No. 345,917. Patented July 20, 1886.

Witnesses:
Albert H. Adams.
Harry T. Jones

Inventor:
John F. Packer (No Model.) 4 Sheets—Sheet 3.
J. F. PACKER.
SEED DROPPER.
No. 345,917. Patented July 20, 1886.
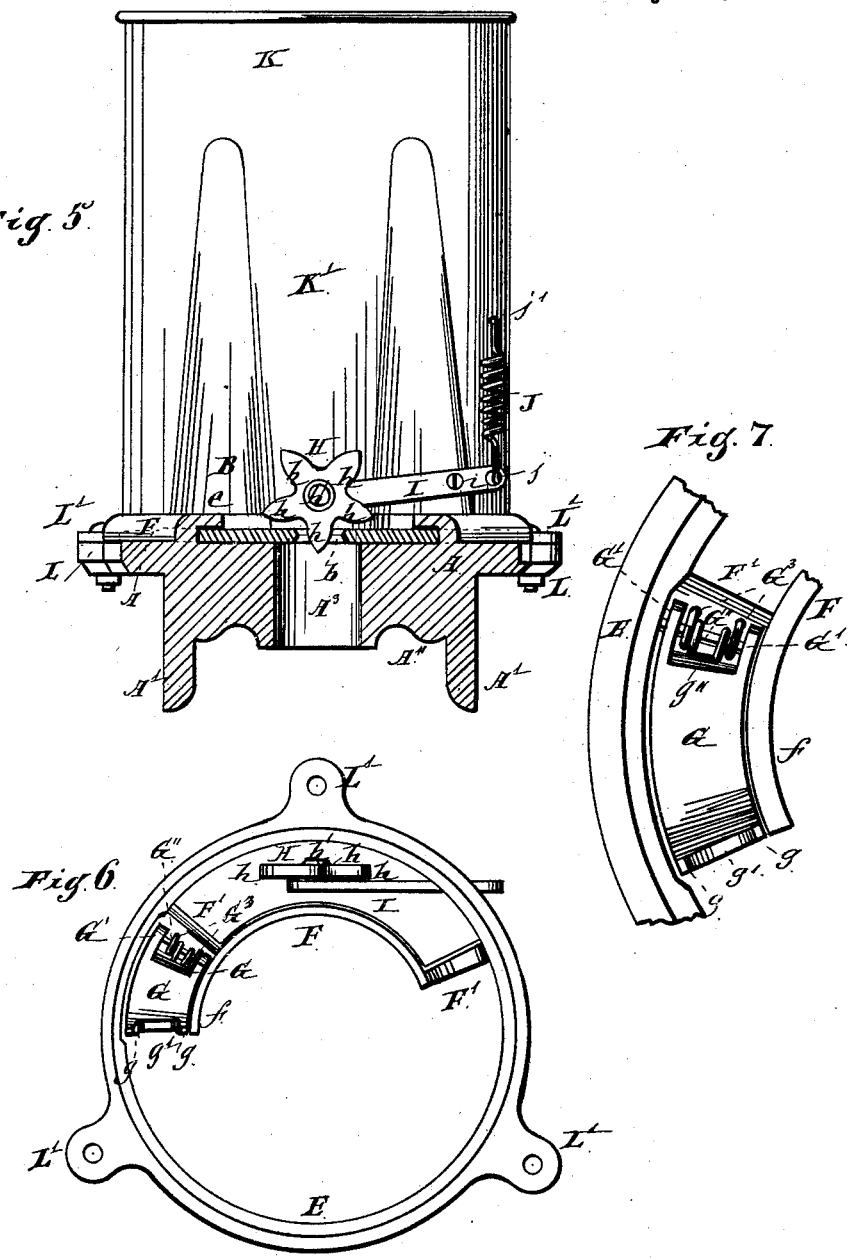

(No Model.) 4 Sheets—Sheet 4.
J. F. PACKER.
SEED DROPPER.
No. 345,917. Patented July 20, 1886.
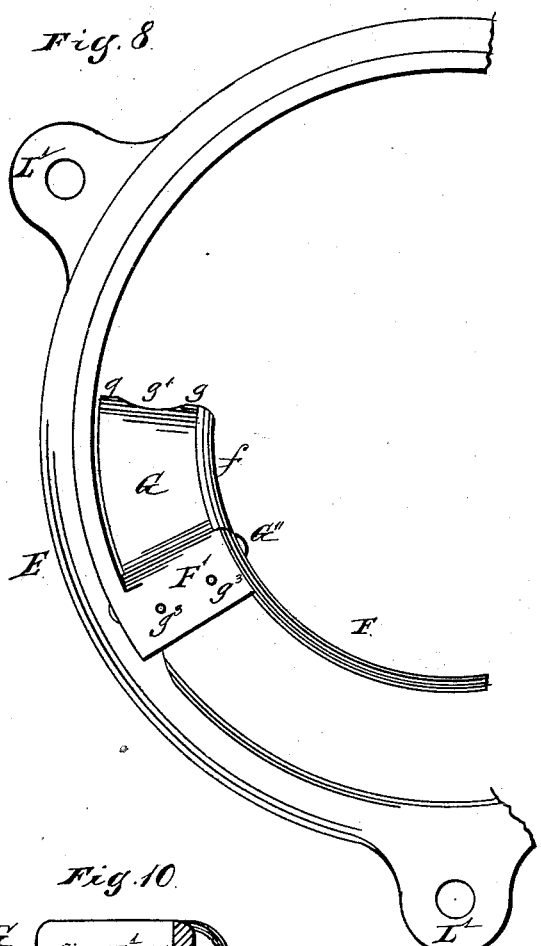
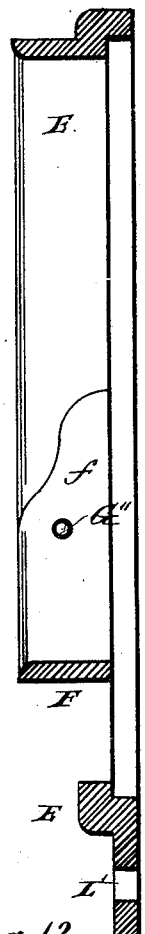
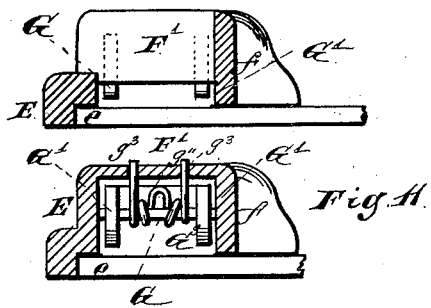
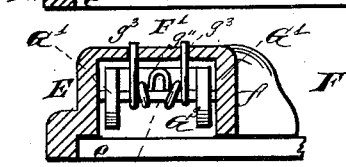
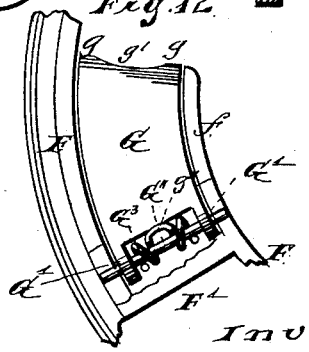
Witnesses:
Albert H. Adams.
Harry T. Jones.
Inventor:
John F. Packer

UNITED STATES PATENT OFFICE.

JOHN F. PACKER, OF CHICAGO, ILLINOIS, ASSIGNOR TO THE DAVID BRADLEY MANUFACTURING COMPANY, OF SAME PLACE.

SEED-DROPPER.

SPECIFICATION forming part of Letters Patent No. 345,917, dated July 20, 1886

Application filed December 28, 1885. Serial No. 186,936. (No model.)

*To all whom it may concern:*

Be it known that I, JOHN F. PACKER, residing at Chicago, in the county of Cook and State of Illinois, and a citizen of the United States, have invented a new and useful Improvement in Seed-Droppers, of which the following is a full description, reference being had to the accompanying drawings, in which—

Figure 1:
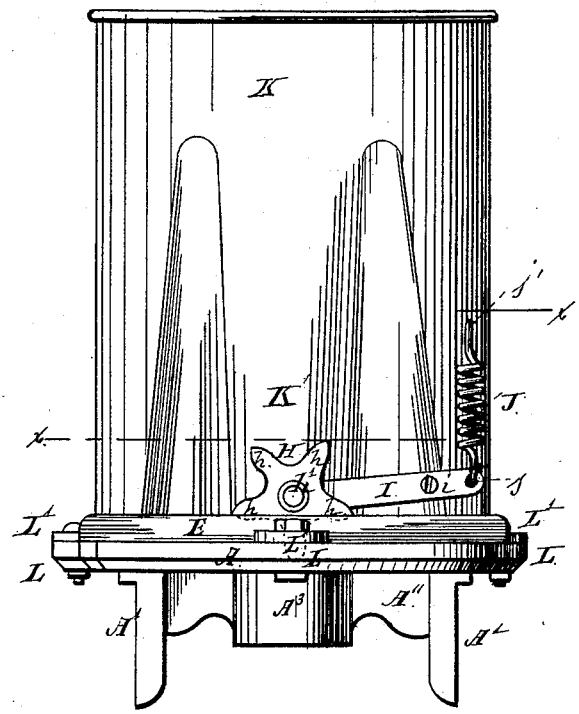
Figure 2:
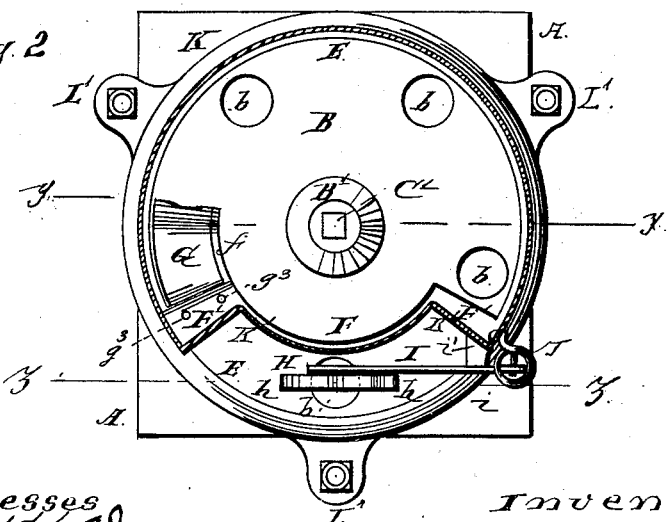
Figure 3:
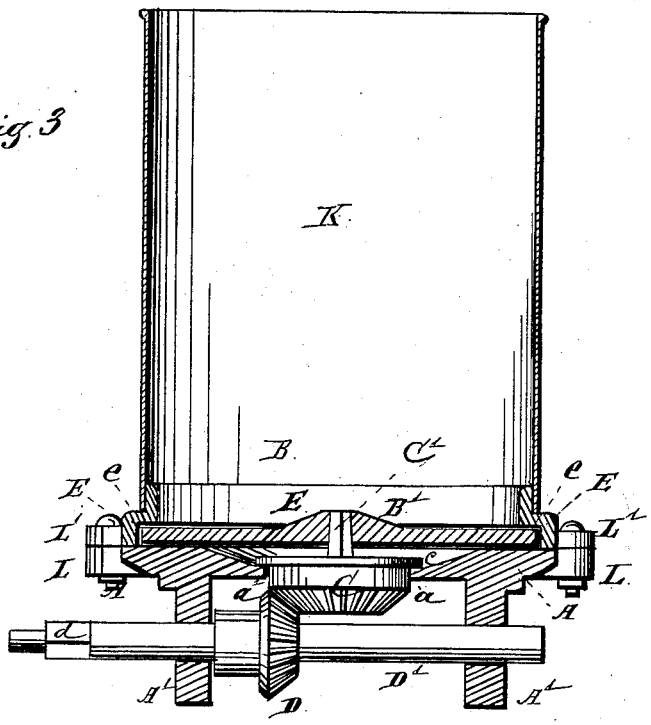
Figure 4:
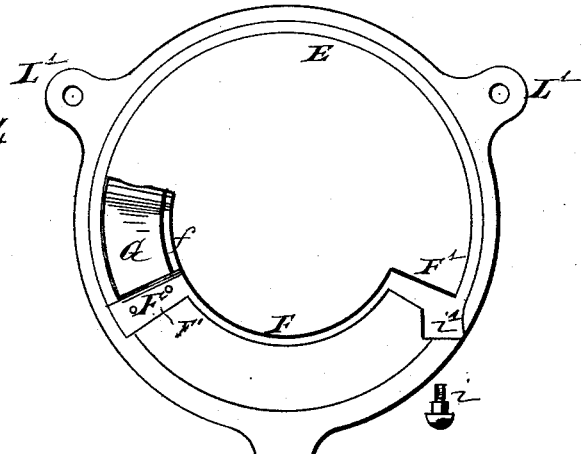

Figure 1 is a side elevation showing the forcing-wheel; Fig. 2, a cross-section on line $x\ x$ of Fig. 1; Fig. 3, a vertical section on line $y\ y$ of Fig. 2; Fig. 4, a top or plan view of the confining or base ring, showing also a detail of the pivot-screw for the lever of the forcing-wheel; Fig. 5, a vertical section on line $z\ z$ of Fig. 2, showing the receptacle in elevation; Fig. 6, a bottom view of the confining or base ring; Fig. 7, an enlarged view of the cut-off, showing the under side thereof; Fig. 8, a detail, enlarged, of the confining-ring with the cut-off in position; Fig. 9, a cross-section of the confining-ring; Figs. 10 and 11, details in section showing the cut-off and its housing; Fig. 12, a detail, being a top or plan view of the cut-off with its housing broken away to show the spring.

This invention has for its objects to improve the construction and operation of seed-droppers in reference to the operation of the cut-off and the production of a forced feed, and also to enable a thin seed-plate to be used, thereby giving the cut-off a better control of the seed in use; and its nature consists in providing a cut-off having its acting end cut out to leave an opening with supports on each side to rest on the seed-plate, and operating to remove an upper kernel, in case two kernels are carried by the seed-hole; in providing a thin seed-plate and a cut-off to coact therewith, having its acting end provided with an opening with supports on each side; in providing a forcing-wheel automatically operating to force the seed from each seed-opening successively, and in the several parts and combinations of parts hereinafter described, and pointed out in the claims as new.

In the drawings, A represents the base-plate or support, which may be of a square shape, as shown, or otherwise, and, as shown, it is provided on two of its sides or ends with depending flanges A′, for attaching the plate to a plow-beam or other support, and the remaining two sides or ends are provided with depending flanges A″, for strengthening purposes, one side or end having also a circular depending portion, A³, with an opening which forms the discharge-opening leading to a dropping-tube. (Not shown.)

B is the seed-plate, having near its periphery a series of holes, $b$, to receive the seed or kernel to be dropped, and this plate, as shown, is provided at its center with a thickened portion, forming a hub or enlargement, B′, having a central square hole.

C is a bevel-gear standing horizontally and supported on a ledge, $a$, around a central opening in the base-plate A, the body of the gear having a flange, $c$, to rest on the ledge $a$, and, as shown, the upper face of the base-plate around the opening for the gear is formed beveling, so as to leave but a small frictional surface between the plate B and the plate A.

D is a bevel-gear meshing with the gear C, and mounted on a shaft, D′, which shaft, as shown, has a square end, $d$, to receive a sprocket-wheel or other driving-wheel, by which the shaft can be rotated, and, as shown, the shaft D′ is supported or has its bearings in the depending flanges A′.

E is a confining-ring having on its inner face a recess, $e$, to receive the periphery of the plate B, and, as shown, this ring E also furnishes the support for the grain-receptacle. The plate B, when the parts are together, rests on the base-plate A, and is held in place by the ring E, through the recess $e$, the ring E being attached to the base-plate A in any suitable manner.

F is a flange located within the ring E at one side, and connected with the ring by end bars or pieces, F′, the parts E F F′, as shown, being cast or formed together, and the flange F at one end, $f$, projects some distance beyond the end bar, F′, at that end, so as to leave a space between the end of the ring E and the wall or bar F′, for the location of the cut-off G, the forward or acting end of which has at each side projections or supports $g$, which rest on the plate B at both sides of the holes $b$, with an opening, $g'$, between them, under which the openings $b$ successively pass, the depth of the opening being one that will leave the lower kernel clear and remove the upper one, in case two kernels are in the same hole, one on top of the other, and by this construction the seed-plate B can be made thin, in comparison with the seed-plates now in use, as the extra thickness heretofore required for the seed-plate to receive two kernels is taken up by the space at the acting end of the cut-off. The rear end of the cut-off is provided with ears G', through which a pin, G'', passes to give the cut-off a pivotal connection, the ends of the pin resting in holes in the end $f$ and in the ring E, as shown in Fig. 12, and around this pin is located a spring, $G^3$, formed by bending the wire at its center and coiling it around the pin, and entering its inner ends, $g^3$, into the holes in the top plate of the cross-piece F', as shown in Figs. 11 and 12, the portion $g''$ of the spring bearing against the heel of the cut-off, to act and throw the acting end of the cut-off down, but leaving such end free to rise for the passage of the seed beneath its acting end in the successive openings $b$.

H is the forcing-wheel, consisting, as shown, of a center with radial arms $h$, each arm coming to a point, and having curved sides, as shown in Fig. 5.

I is an arm or lever attached in a pivotal manner by a screw, $i$, which enters a projection, $i'$, on the cross-bar F', as shown in Figs. 2, 4, and 5, and this arm carries at its end the forcing-wheel H, which is mounted thereon by a suitable pin or pivot, $h'$, so as to be free to turn or revolve.

J is a spring, one end of which is attached to an opening, $j$, in the end of the arm I, and the other enters a hole, $j'$, in the side of the seed-receptacle, as shown in Fig. 5, and, if desired, two or more holes, $j'$, may be provided to adjust the spring J for the force required to throw the wheel H into position for use.

K is a seed-receptacle, the lower end of which encircles the ring E in the form of construction shown.

L represents ears formed on the base A, and L' coinciding ears formed on the ring E, through which ears L L' bolts can be passed for securing the ring to the base A.

In use the seed to be planted is deposited in the receptacle K, as usual, lying on the bottom plate, B, and such plate is rotated through the gear-wheels D C, bringing the seed-holes $b$ successively over the dropping-hole in $A^3$, and the charge carried by each hole $b$ passes under the acting end of the cut-off G, and if two kernels are in the hole the upper one will strike the wall of the notch $g'$ and be held against entering beneath the cut-off, leaving the lower kernel a free and clear space to pass under the cut-off and to the point of discharge, and as the hole having the charge therein passes beneath the wheel H an arm of such wheel drops into the hole, being forced down by the action of the spring J, forcing the charge out of the hole, and this arm, as the plate B passes around, is carried up out of the hole by the action of the walls of the hole, so that the next succeeding arm on the wheel comes into position to pass into the next succeeding hole $b$ and force the seed therefrom, the arms successively entering the succeeding holes as they come around to force out the seed in the hole, and as the plate B passes around the wheel is carried on the surface thereof by two of its arms resting on the surface of the plate, so that as the hole $b$ passes beneath the first arm such arm will enter and force the seed therefrom, and then pass out for the next arm to enter the next hole, and pass out therefrom as the plate rotates, and so on until the work is done.

What I claim as new, and desire to secure by Letters Patent, is—

1. A cut-off having its acting end cut away to leave supports, with an opening between them for removing a top kernel from a seed-hole, substantially as specified.

2. The combination, with a dropping-plate, of a cut-off having its acting end provided with supports, with an opening between them for enabling a thin dropping-plate to be used, substantially as specified.

3. A cut-off, G, provided with ears G' and pivot-pin G'' at its rear end, in combination with a spring, $G^3$, surrounding said pivot-pin, and having an acting portion, $g''$, all constructed and operating substantially as specified.

4. The combination, with a dropping-plate, of a forcing-wheel having a series of arms, and a spring-lever carrying such wheel for automatically turning the wheel to have the arms enter the succeeding holes of the dropping-plate, substantially as specified.

JOHN F. PACKER.

Witnesses.
O. W. BOND,
A. H. ADAMS.